United States Patent
Cheng

(10) Patent No.: US 8,259,919 B2
(45) Date of Patent: Sep. 4, 2012

(54) ANSWERING SYSTEM AND METHOD OF A COMMUNICATION DEVICE

(75) Inventor: Chung-Wei Cheng, Tu-Cheng (TW)

(73) Assignee: Chi Mei Communication Systems, Inc., Tu-Cheng, New Taipei (TC)

( * ) Notice: Subject to any disclaimer, the term of this patent is extended or adjusted under 35 U.S.C. 154(b) by 796 days.

(21) Appl. No.: 12/344,253

(22) Filed: Dec. 25, 2008

(65) Prior Publication Data

US 2009/0316874 A1    Dec. 24, 2009

(30) Foreign Application Priority Data

Jun. 20, 2008   (CN) .......................... 2008 1 0302256

(51) Int. Cl.
*H04M 3/42* (2006.01)
(52) U.S. Cl. ......... 379/207.03; 379/207.06; 379/207.08; 379/207.09; 379/207.1; 379/207.16
(58) Field of Classification Search ............. 379/207.03, 379/142.01, 211.02, 68, 76; 455/88, 414.1, 455/467, 556.1
See application file for complete search history.

(56) References Cited

U.S. PATENT DOCUMENTS

| | | | |
|---|---|---|---|
| 6,813,491 B1* | 11/2004 | McKinney | 455/414.1 |
| 6,999,731 B2* | 2/2006 | Cronin | 455/88 |
| 2005/0233766 A1* | 10/2005 | Futami | 455/556.1 |
| 2006/0240877 A1* | 10/2006 | Filiba et al. | 455/567 |
| 2008/0051035 A1* | 2/2008 | Zhang et al. | 455/67.11 |
| 2008/0280599 A1* | 11/2008 | Cheng | 455/415 |

FOREIGN PATENT DOCUMENTS

CN     1633142     6/2005

* cited by examiner

*Primary Examiner* — Joseph J Nguyen
(74) *Attorney, Agent, or Firm* — Altis Law Group, Inc.

(57) ABSTRACT

A communication device having an answering system sets task names, task schedule times of one or more tasks, predetermined ring settings when an incoming call is received during one of the task schedule times, and setting predetermined recorded message. The answering system is configured for determining if the incoming call is received during one of the task schedule times, ringing using the predetermined ring setting if the incoming call is received during one of the task schedule times, replying to the incoming call with the predetermined recorded message if the incoming call is received during one of the task schedule times and if the incoming call has not been answered.

9 Claims, 5 Drawing Sheets

May 26, 2008

Start time: 08:00

End time: 12:00

Task name: attend meeting

Ring setting: vibrate ▼

Message:

At meeting, inconvenient

Save

FIG. 5

ANSWERING SYSTEM AND METHOD OF A COMMUNICATION DEVICE

BACKGROUND

1. Field of the invention

Embodiments of the present disclosure relate to answering systems and methods, and particularly to an answering system and method of a communication device.

2. Description of related art

Handheld communication devices are designed and built to be compact and lightweight. Since handheld communication devices are often used as personal organizers, they are typically installed with calendar programs. Calendar programs generally show arrangements of days, weeks, and months in a year. For practical purposes, some calendar programs also provide user activity information in a same view. The user activity information includes, for example, a date, start time, task name, and venue of each activity.

Variations of such calendar programs have been proposed and commercialized for a variety of reasons. However, most current calendar programs only provide user activity information for a selected day and an alarm according to a default ring setting when an incoming call is received during the time of the activity. Thus, the ringing would disturb the user in some circumstances. For example, if the user is at a meeting and is inconvenient to answer the incoming call, the handheld communication device still rings using a default ring tone to notify the user that an incoming call is received.

What is needed, therefore, is an answering system and method of the communication device to overcome the above-stated problems.

BRIEF DESCRIPTION OF THE DRAWINGS

FIGS. 3-5 are block diagrams of exemplary interfaces used by the communication device.

DETAILED DESCRIPTION OF CERTAIN INVENTIVE EMBODIMENTS

All of the processes described below may be embodied in, and fully automated via, functional code modules executed by one or more general purpose computers or processors. The code modules may be stored in any type of computer-readable medium or other storage device. Some or all of the methods may alternatively be embodied in specialized computer hardware or communication apparatus.

Figure 1:
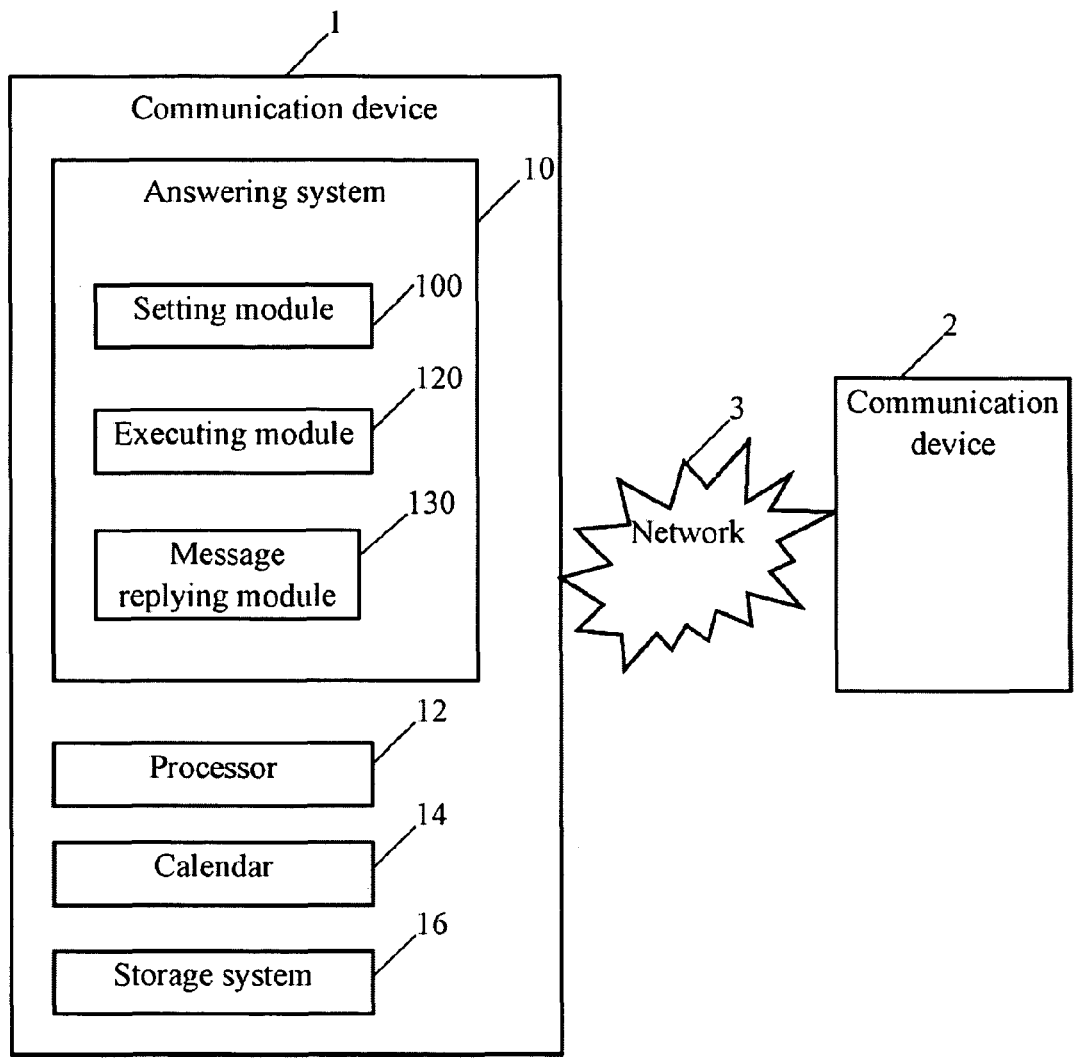
FIG. 1 are block diagrams of one embodiment of a communication device including an answering system.

FIG. 1 is a block diagram of one embodiment of a communication device 1 including an answering system 10. In one embodiment, the communication device 1 (e.g., a mobile phone) further includes a calendar 14 and a storage system 16. The calendar 14 provides a plurality of interfaces for users to set corresponding information of one or more tasks of various times and dates.

The storage system 16 stores various kinds of data used or generated by the answering system 10, such as information of the one or more tasks. Depending on the embodiment, the storage system 16 may include a memory of the communication device 1 or an external storing card, such as a memory stick, a subscriber identity module (SIM) card. The external storing card may be a smart media card (SMC), a secure digital card (SDC), a compact flash card (CFC), a multi media card (MMC), a memory stick (MS), a extreme digital card (XDC), and a trans flash card (TFC).

The answering system 10 is configured for ringing using a predetermined ring setting when an incoming call is received during one of task schedule times, and replying to the incoming call with a predetermined recorded message if the incoming call has not been answered. The answering system 10 includes a setting module 100, an executing module 120, a message replying module 130.

The answering system 10 may further include a processor 12, which is used for executing one or more operations for the setting module 100, the executing module 120, and the message replying module 130.

The setting module 100 is configured for setting task names and task schedule times of one or more tasks in the calendar 14, and setting a predetermined ring setting when an incoming call is received during one of the task schedule times. All the settings may be defined in the interfaces provided by the calendar 14. The task names may define a topic of a task, for example, "attend a meeting" or "prepare reports" in FIG. 4. Each task schedule time may include a date, a start time, and an end time of the task. The set date is shown in an interface of FIG. 3. In one embodiment, the predetermined ring setting may be, but is not limited to a ring setting, a vibration setting, or a mute setting of the communication device 1. The setting module 100 is further configured for setting a predetermined recorded message to automatically answer the incoming call and play the predetermined recorded message to the caller by using the predetermined recorded message if the incoming call has not been answered to let the calling party know that the user of the communication device 1 is unavailable to answer the incoming call.

The executing module 120 is configured for determining if the incoming call is received during one of the task schedule times, and ringing using a corresponding predetermined ring setting if the incoming call is received during one of the task schedule times.

The message replying module 130 is configured for automatically answering the incoming call and playing the predetermined recorded message to the caller by using the predetermined recorded message if the incoming call has not been answered to let the caller know that the user of the communication device 1 is unavailable to answer the incoming call. For example, the message replying module 140 may reply to the incoming call with the predetermined recorded message "At meeting, inconvenient" (as shown in FIG. 5) if the incoming call has not been answered. It may be understood that the predetermined recorded message may be changed by a user of the communication device 1.

Figure 2:
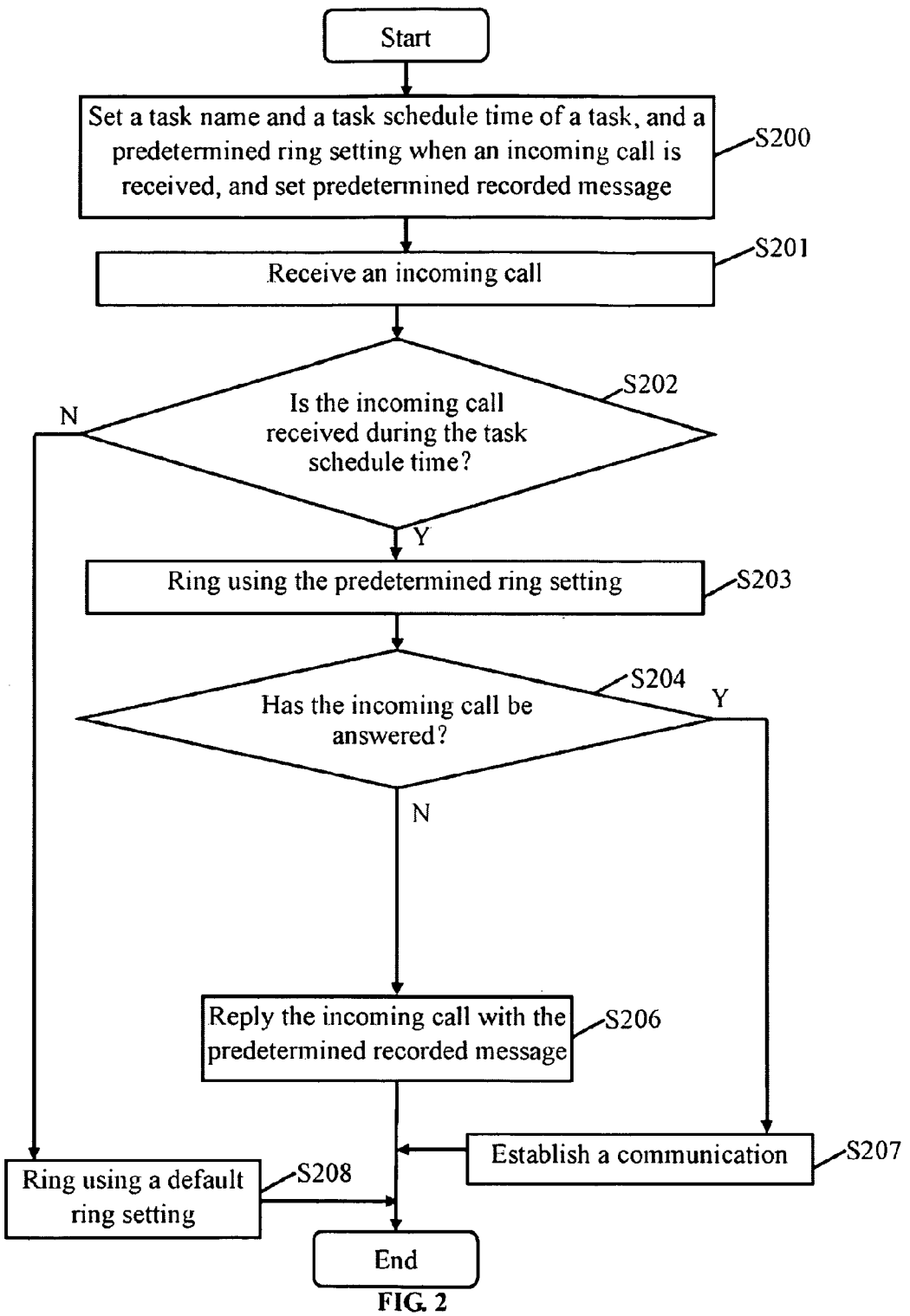
FIG. 2 is a flowchart of one embodiment of an answering method of the communication device of FIG. 1.

FIG. 2 is a flowchart of one embodiment of an answering method by using the answering system 10 in FIG. 1. Depending on the embodiment, additional blocks may be added, others deleted, and the ordering of the blocks may be changed. In block S200, the communication device 1 is powered on and the answering system 10 is invoked. A task schedule time, a task name, a predetermined ring setting, and a predetermined recorded message is configured via the setting module 100. The task schedule time includes a task schedule date, a task start time, and a task end time. For example, as shown in FIG. 5, the task name is set to be "attend a meeting"; the date set to be "May 26, 2008"; the start time set to be "08:00"; the end time set to be "12:00"; the predetermined ring setting set to be "vibrate"; the predetermined recorded message set to be "At meeting, inconvenient".

In block S201, the communication device 1 receives an incoming call from a communication device 2, such as a mobile phone, via a communication network 3.

In block S202, the executing module 120 determines if the incoming call is received during the task schedule time. If the incoming call is not received during the task schedule time, in block S208, then the communication device 1 rings using a default ring setting; otherwise, if the incoming call is received during the task schedule time, the procedure goes to block S203.

In block S203, the executing module 120 rings using the predetermined ring setting of the task if the incoming call is received during the task schedule time.

In block S204, the executing module 120 determines if the incoming call has been answered. If the incoming call has been answered, the procedure goes to block S207 to establish a communication with the other communication device 2; otherwise, the procedure goes to block S206.

In block S206, the message reply module 130 automatically answers the incoming call and plays the predetermined recorded message to the caller by using the predetermined recorded message if the incoming call has not been answered to let the caller know that the user of the communication device 1 is unavailable to answer the incoming call. For example, the message reply module 130 replies the incoming call with the predetermined recorded message "At meeting, inconvenient".

Figure 3:
Figure 4:
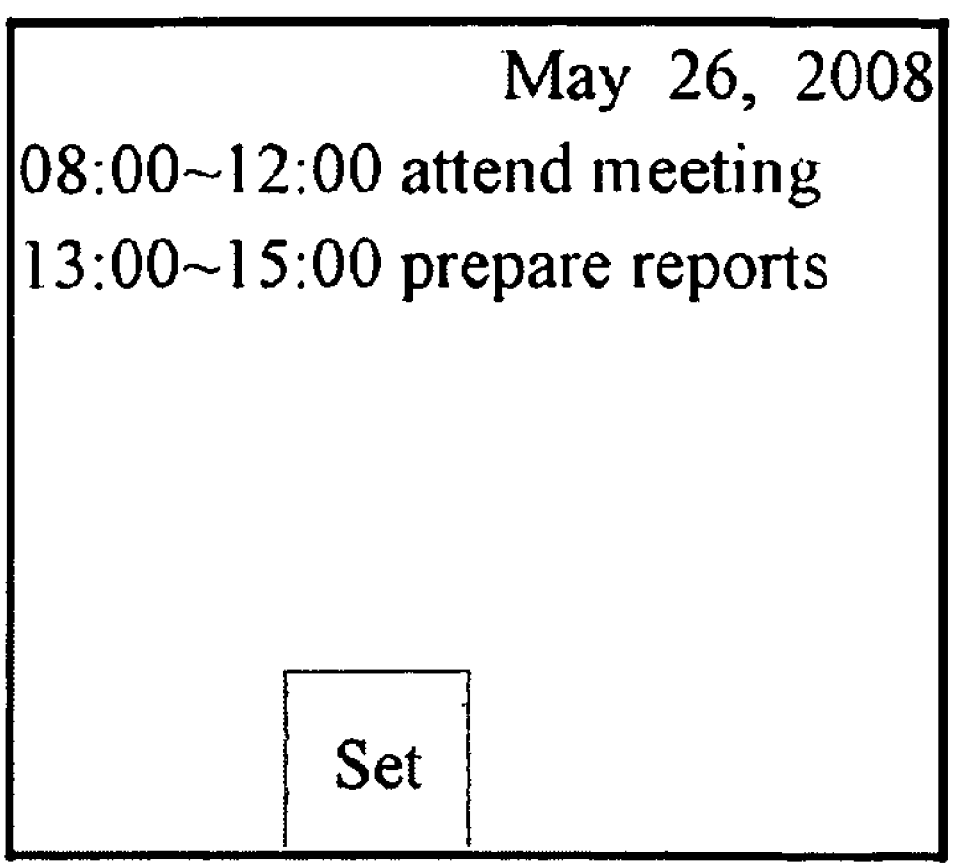

FIGS. 3-5 are block diagrams of exemplary interfaces provided by the calendar 14. Through the interfaces provided by the calendar 14, the task names and the task schedule times of one or more tasks, the predetermined ring settings, and the predetermined recorded message are set by the setting module 100. It may be understood that other settings, buttons, and/or options may be displayed without departing from the spirit of the present disclosure.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An answering system of a communication device, the system comprising:
   a setting module configured for setting task schedule times of one or more tasks, predetermining ring settings when an incoming call is received during one of the task schedule times, and a predetermined recorded message;
   an executing module configured for determining if an incoming call is received during one of the task schedule times, and ringing using the predetermined ring settings when the incoming call is received during one of the task schedule times, ringing using a default ring setting when the incoming call is not received during the task schedule time, and establishing a communication with an electronic device making the incoming call when the incoming call has been answered;
   a message replying module configured for replying to the incoming call with the predetermined recorded message when the incoming call is received during one of the task schedule times and the incoming call has not been answered; and
   a processor configured for executing the setting module, the executing module, and the message replying module.

2. The system as claimed in claim 1, wherein the predetermined ring setting comprises a vibration setting, a ring setting, and a mute setting.

3. The system as claimed in claim 1, wherein each task schedule time comprises a date, a start time and an end time of the one or more tasks.

4. An answering method of a communication device, the method comprising:
   setting a task schedule time of a task, a predetermined ring setting when an incoming call is received during the task schedule time, and setting a predetermined recorded message;
   receiving an incoming call;
   determining if the incoming call is received during the task schedule time of the task;
   ringing using the predetermined ring setting when the incoming call is received during the task schedule time;
   ringing using a default ring setting when the incoming call is not received during the task schedule time
   determining if the incoming call has been answered;
   replying to the incoming call with the predetermined recorded message when the incoming call is received during the task schedule time and the incoming call has not been answered; and
   establishing a communication with an electronic device making the incoming call when the incoming call has been answered.

5. The method as claimed in claim 4, wherein the predetermined ring setting comprises a vibration setting, a ring setting, and a mute setting.

6. The method as claimed in claim 4, wherein the task schedule time comprises a date, a start time and an end time of the task.

7. A non-transitory storage medium having stored thereon computer-executable instructions that, when executed by a communication device, cause the communication device to perform an answering method, the method comprising:
   setting a task schedule time of a task, a predetermined ring setting when an incoming call is received during the task schedule time, and setting a predetermined recorded message;
   receiving an incoming call; determining if the incoming call is received during the task schedule time of the task;
   ringing using the predetermined ring setting when the incoming call is received during the task schedule time;
   ringing using a default ring setting when the incoming call is not received during the task schedule time;
   determining if the incoming call has been answered; and
   replying to the incoming call with the predetermined recorded message when the incoming call is received during the task schedule time and the incoming call has not been answered; or
   establishing a communication with an electronic device making the incoming call when the incoming call has been answered.

8. The non-transitory storage medium as claimed in claim 7, wherein the predetermined ring setting comprises a vibration setting, a ring setting, and a mute setting.

9. The non-transitory storage medium as claimed in claim 7, wherein the task schedule time comprises a date, a start time and an end time of the task.

* * * * *